(12) United States Patent
Gill et al.

(10) Patent No.: US 10,053,394 B2
(45) Date of Patent: Aug. 21, 2018

(54) POLYMERS USEFUL IN AGRICULTURAL APPLICATIONS

(71) Applicant: Ecolab USA Inc., St. Paul, MN (US)

(72) Inventors: Jasbir S. Gill, Naperville, IL (US); Manian Ramesh, Barrington, IL (US); David R. Szymborski, Oswego, IL (US); William H. Morris, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 279 days.

(21) Appl. No.: 14/858,774

(22) Filed: Sep. 18, 2015

(65) Prior Publication Data

US 2016/0009606 A1    Jan. 14, 2016

Related U.S. Application Data

(62) Division of application No. 13/857,792, filed on Apr. 5, 2013, now Pat. No. 9,169,164.

(51) Int. Cl.
*A01C 23/04*    (2006.01)
*A01G 25/16*    (2006.01)
*C05G 3/00*    (2006.01)
*A01C 1/06*    (2006.01)
*G05B 19/042*    (2006.01)

(52) U.S. Cl.
CPC .......... *C05G 3/00* (2013.01); *A01C 1/06* (2013.01); *A01C 23/042* (2013.01); *A01G 25/16* (2013.01); *C05G 3/0029* (2013.01); *G05B 19/042* (2013.01); *G05B 2219/2625* (2013.01)

(58) Field of Classification Search
None
See application file for complete search history.

(56) References Cited

U.S. PATENT DOCUMENTS 6,000,625 A * 12/1999 Cole ............ C05G 3/04
  239/10
8,821,646 B1 * 9/2014 Miller ............ A01G 25/00
  134/22.12

* cited by examiner

*Primary Examiner* — Wayne Langel
(74) *Attorney, Agent, or Firm* — Eric D. Babych; Brinks Gilson & Lione

(57) ABSTRACT

Methods of coating seeds with polymers and seeds coated with such polymers are disclosed herein. The polymers can be phosphonates, sulfonates, polymers of ethylenically unsaturated carboxylic acids, polyaminopolyethermethylene phosphonate, polysuccinic oligomers, acrylic acid/2-acrylamido-2-methylpropane sulfonic acid, blends of acrylic acid/2-acrylamido-2-methylpropane sulfonic acid with polyaminopolyethermethylene phosphonate, sulfomethylated acrylic acid/acrylamide, blends of sulfomethylated acrylic acid/acrylamide with polyaminopolyethermethylene phosphonate, polymaleic acid, acrylic acid/acrylamide copolymers, polyacrylic acid, trimethylglycine hydrochloride, blends of polyaminopolyethermethylene phosphonate with trimethylglycine hydrochloride, and any combination or salt of such polymers. Methods of monitoring, determining, and controlling the concentration of scale inhibitors in an agricultural irrigation system are also disclosed herein.

7 Claims, 3 Drawing Sheets

POLYMERS USEFUL IN AGRICULTURAL APPLICATIONS

BACKGROUND OF THE INVENTION

1. Field of the Invention

The present disclosure relates to the use of fertilizer enhancing compositions in agricultural applications. More particularly, the present disclosure relates to scale inhibitors used as fertilizer enhancing compositions, methods of monitoring such compositions, and seeds coated with such compositions.

2. Description of the Related Art

Fertilizers are materials or combinations of materials that are added to soil to improve the growth rate of plants, the health of plants, and/or the yield of plant fruits. Fertilizers are added to soils to enrich or replenish chemical nutrients in the soil that are vital to plant growth. A soil may be naturally lacking in a needed chemical nutrient or the deficiency may be due to the removal of chemicals by crops previously grown in that location. In either case, the use of fertilizer increases productivity, as measured by ratios, such as yield per acre or yield per man hour.

Generally, plants consume all nutrients from the soil, with the exception of carbon, oxygen, and hydrogen. Typical soil-based nutrients essential to plant growth include, but are not limited to, nitrogen, silicon, magnesium, oxides of iron and calcium, chlorides, sulfates, magnesia, phosphates, soda, and potash. These nutrients can be replenished in the soil by using certain fertilizers. In addition, secondary nutrients can be added to fertilizer compositions as required. Secondary nutrients include, but are not limited to, boron, copper, iron, manganese, molybdenum, zinc and magnesium.

It is estimated that approximately 20 percent of fertilizer added to soil becomes available to plants. For example, it is known that a major portion of phosphate fertilizers precipitate as insoluble inorganic salts, such as calcium phosphate, zinc phosphate, or salts of phosphate and other ions present in the soil. Thus, when phosphorus is added to the soil, it can form phosphate salts, which may also be referred to as non-labile phosphorus. This non-labile phosphorus is not useful to the plants and therefore, preventing formation of non-labile phosphorus is of great interest in the industry.

BRIEF SUMMARY OF THE INVENTION

Methods of coating seeds are disclosed herein. In one aspect, the method comprises the steps of adding the seeds to an emulsion containing one or more scale inhibitors and one or more water absorbent polymers; soaking the seeds in the emulsion for a period of time; removing the seeds from the emulsion; and drying the seeds.

Seeds coated with polymers are also disclosed herein. In an aspect, a seed is provided, which comprises a coating, wherein the coating comprises one or more scale inhibitors selected from the group consisting of phosphonates, sulfonates, polymers of ethylenically unsaturated carboxylic acids, polyaminopolyethermethylene phosphonate, polysuccinic oligomers, acrylic acid/2-acrylamido-2-methylpropane sulfonic acid, blends of acrylic acid/2-acrylamido-2-methylpropane sulfonic acid with polyaminopolyethermethylene phosphonate, sulfomethylated acrylic acid/acrylamide, blends of sulfomethylated acrylic acid/acrylamide with polyaminopolyethermethylene phosphonate, polymaleic acid, acrylic acid/acrylamide copolymers, polyacrylic acid, trimethylglycine hydrochloride, blends of polyaminopolyethermethylene phosphonate with trimethylglycine hydrochloride, and any combination or salt thereof.

Methods of monitoring, determining, and controlling the concentration of scale inhibitors in an agricultural irrigation system are also disclosed herein. In one aspect, the method comprises the steps of providing an irrigation pipeline having a first end, a second end, and a side stream pipe near the second end; providing a water pump in communication with a water source that is in fluid communication with the first end of the irrigation pipeline; providing a scale inhibitor pump that is in communication with a scale inhibitor storage device that is in fluid communication with an injection site near the first end of the irrigation pipeline, wherein said scale inhibitor storage device comprises one or more scale inhibitor compositions, further wherein a fluorescent tag is copolymerized onto a backbone of the one or more scale inhibitor compositions; providing a fluorometer that is operably connected to and in communication with the side stream pipe of the irrigation pipeline, wherein the fluorometer comprises a controller; preprogramming an optimal fluorescent signal value into the controller; pumping water into the first end of the irrigation pipeline; pumping a known amount of the one or more scale inhibitor compositions into the injection site of the irrigation pipeline whereby the one or more scale inhibitor compositions combine with the water to form a mixture; allowing the mixture to flow through the pipeline whereby a majority of the mixture exits the second end of the pipeline and a portion of the mixture is routed through the side stream pipe and the fluorometer; and measuring the fluorescent signal of the portion of the mixture.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

Figure 1:
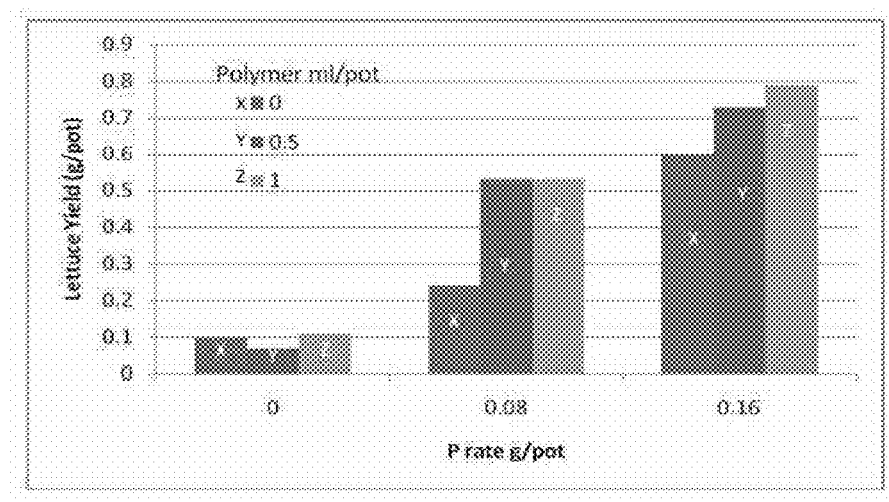
FIG. 1 shows dry weights of plants from an experiment where the soil was treated with different amounts of a presently disclosed scale inhibitor versus dry weights of plants in untreated soil.

The present disclosure relates to fertilizer enhancing compositions and fluorescent polymer tags that are useful in agricultural applications. The fertilizer enhancing compositions can be polymers, such as scale inhibiting polymers ("scale inhibitor"), and they provide for greater availability of fertilizer nutrients to plants. Additionally, the polymers increase the availability of other plant nutrients, including, but not limited to, boron, copper, iron, manganese, molybdenum, zinc and magnesium.

When the presently disclosed polymers are added to fertilizer, they inhibit the precipitation of insoluble inorganic salts, which would normally occur when the fertilizer dissolves in water from irrigation or rain. By inhibiting precipitation of these insoluble salts, more fertilizer becomes available to the plants. Additionally, other nutrients, such as zinc ions, become available to the plants.

The term "scale inhibitor" generally refers to any compound that inhibits the precipitation of scale forming salts in aqueous systems. Scale forming salts include, but are not limited to, calcium carbonate, calcium sulfate, calcium phosphate, calcium phosphonate, calcium oxalate, calcium fluoride, barium sulfate, and magnesium salts.

Examples of scale inhibitors that may be used in connection with the present disclosure include, but are not limited to, phosphonates, sulfonates, and polymers of ethylenically unsaturated carboxylic acids. Other examples of scale inhibitors that may be used in connection with the present disclosure include, but are not limited to, polyaminopolyethermethylene phosphonate (PAPEMP), polysuccinic oligomers (PSO), and blends of acrylic acid/2-acrylamido-2-methylpropane sulfonic acid (AA/AMPS), and/or sulfomethylated acrylic acid/acrylamide (AA/ACAM) with PAPEMP, PSO, polymaleic acid (PMA), acrylic acid/acrylamide copolymers, polyacrylic acid (PAA), and/or trimethylglycine hydrochloride (TMG). Other illustrative examples of scale inhibitors are copolymers of maleic acid with AA, AMPS, or other sulfonated moieties, such sulfostyrene and allylsulfonate. Any combination of the foregoing scale inhibitors may be used and salts of any of these compounds can be used as well. Moreover, any monomer ratio can be used in accordance with the presently disclosed polymers. For example, in an aspect, if the scale inhibitor is AA/AMPS, the ratio of AA to AMPS can be from 100:1 to 1:100. As stated, any monomer ratio can be used in accordance with any of the polymers, such as 1:100, 1:50, 1:25, 1:10, 1:5, 1:1, 5:1, 10:1, 25:1, 50:1, or 100:1.

In one aspect, the scale inhibitor comprises sulfomethylated AA/ACAM. In other aspects, the scale inhibitor comprises AA/AMPS. In a certain aspect, the scale inhibitor comprises the ammonium salt of AA/AMPS. In another aspect, the scale inhibitor comprises the ammonium salt of sulfomethylated AA/ACAM. In an additional aspect, the scale inhibitor comprises the ammonium salt of PAPEMP. In a further aspect, the scale inhibitor comprises a blend of PAPEMP and TMG. In yet another aspect, the scale inhibitor comprises a blend of PSO and TMG.

Without wishing to be bound by any theory, it is believed that by using the ammonium salt of any of the foregoing compositions, the Mg/Ca ratio in the soil can be manipulated to drive phosphate to magnesium phosphate as opposed to the less soluble/less labile calcium phosphate.

An effective amount of the scale inhibitor could be added to the fertilizer for a one-step application of the fertilizer/scale inhibitor composition. Alternatively, an effective amount of a scale inhibiting composition can be added directly to the soil. Moreover, an effective amount of the scale inhibitor can be mixed with the water being used to water the crops or an effective amount of the scale inhibitor can be coated onto the seeds planted in the soil. Any technique of application commonly known and used in the art can be utilized. For example, dry compositions of fertilizer and scale inhibitor can be mixed and applied directly to the soil, liquid compositions of the scale inhibitor and fertilizer can be prepared by diluting each component in an aqueous solution and combining, or the scale inhibitor and fertilizer can be added to the soil separately by any suitable means.

The term "effective amount" means the quantity of scale inhibitor which, when added to the soil, water, fertilizer, or seeds, aids in preventing the formation and precipitation of insoluble salts in the soil under growing conditions. Generally, at least 0.001 part scale inhibitor per part of fertilizer, by weight, should be added. The ratio of scale inhibitor to fertilizer may be as high as 1000:1, on a weight basis. In an aspect, the ratio of scale inhibitor to fertilizer ranges from 100:1 to 1:100, on a weight basis. In another aspect, the ratio ranges from 10:1 to 1:10, on a weight basis. Based on the soil being treated, the scale inhibitor could be added at a dosage of at least 0.1 ppm, based on total dry soil weight, and in certain aspects, it can be added at a dosage from 0.1 ppm-100 ppm, based on total dry soil weight. For example, the scale inhibitor can be added at about 0.2 ppm to about 1 ppm, about 5 ppm to about 15 ppm, about 25 ppm to about 50 ppm, or about 70 ppm to about 90 ppm.

The molecular weight of the scale inhibitors is not critical for this application. In an aspect, the scale inhibitors can have molecular weights (number average molecular weights) of less than 500, as determined by light scattering techniques. In other aspects, the scale inhibitors can have molecular weights ranging from 500-100,000, as determined by light scattering techniques. In a further aspect, the molecular weights of the scale inhibitors can range from 500-25,000, as determined by light scattering techniques.

The presently disclosed scale inhibitors increase the amount of labile phosphate in the soil, which can be absorbed by the plants and lead to increased plant production. In certain aspects, the scale inhibitor can be applied to the soil with the fertilizer to ensure that the form of phosphate in the soil remains suitable for plant uptake. For example, in certain crop fields, irrigation systems are used to supply water to the crops. The presently disclosed scale inhibitors can be mixed with the irrigation water and applied to the crops. In this aspect, not only will the presently disclosed scale inhibitors provide increased crop production, they will also prevent fouling of the irrigation sprinkler heads. Regardless of the method used to supply water to the crops, the presently disclosed scale inhibitors can be mixed with the water before it is applied to the crops.

In other aspects, the scale inhibitor can be coated on seeds to be planted in the soil. Coating seeds with the presently disclosed scale inhibitors has many advantages. For example, it promotes healthy growth of the plant, it assists in maintaining seed viability during storage, and it improves seed germination. Coating of the seeds can be achieved by using any commercially available seed coating equipment that can handle solids, liquids, and emulsions. The seeds can be soaked in an emulsion or slurry containing fertilizer, one or more scale inhibitors, and one or more water absorbent polymers, such as high molecular weight polyacrylates. The high molecular weights can range from 10,000 to Ser. No. 10/000,000, or from 50,000 to 5,000,000, or from 100,000 to 1,000,000. The amount of each component in the mixture varies over a wide range. In one aspect, a typical mixture can include from about 1% to about 10% scale inhibitor, from about 1% to about 10% of the water absorbent polymer, and about 2% to about 80% fertilizer. A typical concentration of the slurry can be about 5% to about 80% solids. After soaking the seeds for any period of time, which can be as brief as about 30 seconds, the seeds are removed from the slurry and air dried. The air dried seeds can be stored in a dry and cool location until they are ready for plantation.

Any type of seed can be coated with any of the scale inhibitors disclosed herein or any combination of the scale inhibitors disclosed herein. Illustrative examples of seeds that can be coated with the presently disclosed scale inhibitors include seeds for growing corn, tomatoes, lettuce, wheat, spinach, alfalfa, grasses, tobacco, trees, flowers, cucumbers, peppers, etc. In one aspect, a seed coated with an AA/AMPS copolymer is disclosed. In another aspect, a seed coated with a sulfomethylated AA/ACAM copolymer is disclosed. In other aspects, a seed coated with a blend of PAPEMP and TMG is disclosed. In yet another aspect, a seed coated with a blend of PSO and TMG is disclosed. As previously mentioned, the present disclosure is intended to cover any seed coated with any of the scale inhibitors disclosed herein or any combination of the scale inhibitors disclosed herein.

In another aspect, the presently disclosed scale inhibitors can be in the form of dry polymer ammonium salts. The ammonium salt form of the scale inhibitor can be mixed with the dry fertilizer and applied in combination with the fertilizer to the crops to be treated.

In any aspect disclosed herein, the scale inhibitors may be tagged with a fluorescent molecule or tag for tracking of the scale inhibitor and feed control. The fluorescent tags or molecules can be copolymerized onto the backbone of the scale inhibitor polymers. In certain aspects, the fluorescent tags can be selected from the group consisting of hydroxyl allyloxy propyl naphthalimide quaternary salt (HAPNQ), pyrene tetrasulfonic acid (PTSA), and naphthalenedisulfonic acid (NDSA), although one of ordinary skill in the art will realize that other tags can be selected so long as they are capable of being copolymerized onto the backbone of the presently disclosed scale inhibitors. In certain aspects, the scale inhibitor comprises about 2% to about 5%, by weight, of the fluorescent tag. In other aspects, the scale inhibitor comprises less than 2%, by weight, of the fluorescent tag and in other aspects, the scale inhibitor comprises less than 1%, by weight, of the fluorescent tag.

When the scale inhibitors are tagged with a fluorescent molecule, one can determine how much scale inhibitor is actually being delivered to the soil, for example, when the scale inhibitor is combined with irrigation water. In one aspect, a fluorometer can be present at a location where the water exits an irrigation pipeline and the fluorescent signal of the water exiting the pipeline can be measured, which would reveal the precise amount of scale inhibitor exiting the irrigation pipeline. Moreover, by using grab-sampling techniques, one can determine how much scale inhibitor is in the soil by measuring its fluorescence.

Therefore, methods of monitoring and controlling fertilizer enhancing polymer content (scale inhibitor content) are also disclosed herein. One aspect relates to monitoring and controlling the irrigation water and the amount of scale inhibitor therein. An irrigation water monitoring and controlling system can include a controller device and a fluorometer. In certain aspects, the fluorometer comprises the controller or the fluorometer is the controller. The fluorometer is in communication with the controller. In certain aspects, the monitoring and controlling system can be attached to the irrigation water pipeline. For example, the fluorometer can be attached near an end of the irrigation pipeline (where the water exits to water the crops). In certain aspects, a side stream is taken from the pipeline and the fluorometer is attached to the side stream pipe. Irrigation water and an amount one or more scale inhibitors are pumped into the irrigation pipeline and as the mixture of water and scale inhibitor passes through the irrigation pipeline, a small portion of the mixture is diverted through the side stream pipe. The fluorescent signal of the mixture in the side stream is then measured and the mixture from the side stream pipe can either be discarded or returned back into the irrigation pipeline.

As used herein, the term "controller" or "controller device" refers to a manual operator or an electronic device having components such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components. As previously mentioned, any of the fluorometers disclosed herein can be the controller or can comprise the controller. The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components such as a signal conditioner or system monitor may be included to facilitate signal transmission and signal-processing algorithms.

In some aspects, the monitoring and controlling system includes an automated controller. In other aspects, the controller is manual or semi-manual. For example, where the system includes one or more datasets received from a fluorometer in the system, the controller may either automatically determine which data points/datasets to further process or an operator may partially or fully make such a determination. A dataset for irrigation water, for instance, may include variables or system parameters such concentrations of scale inhibitors. Such system parameters are typically measured with any type of suitable data capturing equipment. Data capturing equipment is in communication with the controller and, according to alternative embodiments, may have advanced functions (including any part of the control algorithms described herein) imparted by the controller.

The presently disclosed monitoring and controlling system can also comprise one or more pumps. These pumps can be in fluid communication with a first end of the irrigation pipeline. In one aspect, an irrigation water pump injects water from a well or other water source into a first end of the irrigation pipeline. The water travels through the pipeline towards the second end of the pipeline, where a portion of it may be diverted to a side stream pipe. The water traveling through the side stream pipe can have its fluorescence measured and either be discarded or returned back to the irrigation pipeline for crop watering.

The monitoring and controlling system also comprises one or more scale inhibitor pumps. Each scale inhibitor pump injects one or more scale inhibitor compositions into an injection site near the first end of the irrigation pipeline.

For example, if the irrigation pipeline begins underground at a well, as the pipe rises from the ground, a scale inhibitor injection site can be formed on the pipeline above the ground. The scale inhibitor pump can comprise one or more scale inhibitor compositions or the scale inhibitor pump can be in communication with a storage device comprising one or more scale inhibitor compositions. In certain aspects, there can be any number of scale inhibitor storage devices comprising any scale inhibitor disclosed herein, or a combination of scale inhibitors disclosed herein, and each scale inhibitor storage device is associated with a scale inhibitor pump. The one or more scale inhibitor compositions can have fluorescent tags copolymerized onto their backbones.

The disclosed monitoring and controlling system provides methods to generate real-time, on-line, reliable data from irrigation water. In all aspects, the presently disclosed pumps can be in communication with the controller. For example, when the monitoring and controlling system comprises a scale inhibitor pump, this pump can be in communication with the controller in any number of ways, including, as examples, through any combination of wired connection, a wireless connection, electronically, cellularly, through infrared, satellite, or according to any other types of communication networks, topologies, protocols, standards and more. Accordingly, the controller can send signals to the pump to control its chemical (scale inhibitor) feed rate.

In an aspect, the monitoring and controlling system is implemented to have the fluorometer provide continuous or intermittent feedback, feed-forward, or predictive information to the controller, which can relay this information to a relay device, such as the Nalco Global Gateway, which can transmit the information via cellular communications to a remote device, such as a cellular telephone, computer, or any other device that can receive cellular communications. This remote device can interpret the information and automatically send a signal (e.g. electronic instructions) back, through the relay device, to the controller to cause the controller to make certain adjustments to the output of the pumps. The information can also be processed internally by the controller and the controller can automatically send signals to the pumps, to adjust the amount of chemical injection.

Based upon the information received by the controller from the fluorometer or the remote device, the controller can transmit signals to the various pumps to make automatic, real-time adjustments, to the amount of chemical that the pumps are injecting into the irrigation water or the amount of irrigation water being pumped into the irrigation pipeline.

Alternatively, an operator of the remote device that receives cellular communications from the controller can manually manipulate the pumps through the remote device. The operator can communicate instructions, through the remote device, cellularly or otherwise, to the controller and the controller can make adjustments to the rate of chemical addition of the scale inhibitor pump or the flow rate of a pump associated with the irrigation water source.

For example, the operator can receive a signal or alarm from the remote device through a cellular communication from the controller and send instructions or a signal back to the controller using the remote device to turn on one of the pumps, turn off one of the pumps, increase or decrease the amount of chemical (scale inhibitor) being added to the irrigation pipeline, or any combination of the foregoing. The controller and/or the remote device is also capable of making any of the foregoing adjustments or modifications automatically without the operator actually sending or inputting any instructions. This capability results because preset parameters or programs can be inputted into the controller or remote device so that the controller or remote device can determine if a measured fluorescent signal is outside of an optimal or acceptable range and based on the information received by the fluorometer, the controller or remote device can make appropriate adjustments to the pumps or send out an appropriate alert because it has been programmed to do so.

In certain aspects, the remote device or controller can include appropriate software to receive data from the fluorometer and determine if the data indicates that the measured fluorescence of the water is within, or outside, an acceptable or optimal range. The software can also allow the controller or remote device to determine appropriate actions that should be taken to remedy the problem, if the fluorescence is outside of the acceptable range. For example, if the measured fluorescence is above the acceptable range, the software allows the controller or remote device to make this determination and take remedial action, such as alerting a scale inhibitor pump to decrease the flow of scale inhibitor being pumped into the irrigation pipeline.

The monitoring and controlling system and/or controller disclosed herein can incorporate programming logic to convert analyzer signals from the fluorometer to pump adjustment logic and, in certain embodiments, control one or more pumps, with a unique basis.

In an aspect, the disclosure provides a method for monitoring, controlling, and/or optimizing one or more properties of the irrigation water. A property, such as fluorescence, of the irrigation water is measured and/or predicted, and is subsequently converted into an input signal, such as an electrical input signal, capable of being transmitted from a fluorometer to the controller. In turn, the controller is operable to receive the transmitted input signal, convert the received signal into an input numerical value, analyze the input numerical value, generate an output numerical value, convert the output numerical value into an output signal, and transmit the output signal to, for example, the remote communication device or one or more of the pumps.

As noted herein, the monitoring and controlling system comprises a fluorometer operable to sense and/or predict the fluorescent signal of the irrigation water. It can also convert the fluorescent signal into an input signal, e.g., an electric signal, capable of being transmitted to the controller. A transmitter associated with the fluorometer transmits the input signal to the controller. The controller is operable to receive the transmitted input signal, convert the received input signal into an input numerical value, analyze the input numerical value to determine if the input numerical value is within an optimum or acceptable range, generate an output numerical value, convert the output numerical value into an output signal, e.g., an electrical signal, and transmit the output signal to a receiver, such as a pump incorporating such receiver capabilities or a remote device, such as a computer or cellular telephone, incorporating receiver capabilities. The receiver receives the output signal and either alerts an operator to make adjustments to flow rates of the pumps, or the receiver can be operable to cause a change in a flow rate of the pumps automatically, if the output numerical value is not within the acceptable or optimal range for that property.

Data transmission of measured fluorescence or signals to pumps, alarms, remote monitoring devices such as computers or cellular telephones, or other system components is accomplished using any suitable device, and across any number of wired and/or wireless networks, including as examples, WiFi, WiMAX, Ethernet, cable, digital subscriber line, Bluetooth, cellular technologies (e.g., 2G, 3G, Universal Mobile Telecommunications System (UMTS), GSM, Long Term Evolution (LTE)), or others. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used. As used herein, the term "network" encompasses all of these data transmission methods. Any of the described devices (e.g., archiving systems, data analysis stations, data capturing devices, process devices, remote monitoring devices, pumps, etc.) may be connected to one another using the above-described or other suitable interface or connection.

In accordance with an aspect of the present disclosure, a method of monitoring and controlling one or more properties of irrigation water is provided. As previously mentioned, a property that can be measured in accordance with the present disclosure is fluorescence.

The method can comprise the step of (a) providing a storage device for the irrigation water. For example, the storage device can be a pond or a well. The method can also comprise the steps of (b) providing an irrigation pipeline having a first end in communication with the irrigation water storage device and a second end in proximity to the crops to be watered, wherein the irrigation pipeline comprises a side stream pipe near its second end; (c) providing a fluorometer comprising a controller on the side stream pipe, wherein water from the side stream pipe is routed through the fluorometer and routed back into the side stream pipe; and (d) providing one or more pumps, which are in communication with the controller. For example, a scale inhibitor pump can be provided that is operable to inject one or more scale inhibitor compositions into the first end of the irrigation pipeline. The scale inhibitor compositions include fluorescent tags copolymerized onto their backbones. The method can further comprise the steps of (e) inputting an acceptable range for the fluorescent signal of the irrigation water to be measured into the controller; (f) pumping water and a predetermined amount of one or more scale inhibitor compositions into the first end of the irrigation pipeline, thereby forming a mixture; (g) allowing the mixture to travel through the pipeline; (h) diverting a portion of the mixture through the side stream pipe and the fluorometer, wherein the fluorometer measures a fluorescent signal of the mixture and subsequently, the mixture is routed back into the irrigation pipeline; and (i) determining if the measured fluorescent signal of the mixture is within the acceptable range inputted into the controller in step (e). This determining step can be automatically performed by the controller and in this step, the measured fluorescent signal is compared to the acceptable range inputted for the fluorescent signal.

If it is determined that the measured fluorescent signal is outside of the acceptable range inputted in step (e), the method further includes the steps of (j) causing a change in an influx of one or more scale inhibitor compositions into the first end of the irrigation pipeline, the one or more scale inhibitor compositions being capable of adjusting the fluorescent signal associated with the irrigation water in a manner to bring the fluorescent signal within the acceptable range. For example, if the measured fluorescent signal is higher than an acceptable fluorescent signal, then a scale inhibitor pump can be signaled and caused to decrease the amount of scale inhibitor that is being injected into the first end of the irrigation pipeline, to bring the fluorescent signal back within the acceptable range.

Also provided is a system for optimizing one or more properties of irrigation water. The system comprises (a) a fluorometer operable to measure a fluorescent signal associated with the irrigation water and convert the fluorescent signal into an input signal capable of being transmitted; (b) a transmitter associated with the fluorometer operable to transmit the input signal; (c) a controller operable to receive the transmitted input signal, convert the received input signal into an input numerical value, analyze the input numerical value, determine if the analyzed value is within an acceptable range, generate an output numerical value based upon the analyzed value, convert the output numerical value into an output signal, and transmit the output signal; (d) a receiver operable to receive the output signal and cause a change in an influx rate of a chemical (e.g. one or more scale inhibitors) injected into the irrigation water by one or more chemical injection pumps if the output numerical signal is not within the acceptable range, wherein the chemical is capable of adjusting the measured property to come within the acceptable range for that property.

The fluorometer used to detect the fluorescent signal of the fluorescent tag bound to the scale inhibitor can be any commercially available fluorometer capable of detecting the fluorescent signal of the tag. Certain acceptable fluorometers are disclosed in U.S. Pat. No. 6,790,664, the contents of which are expressly incorporated into the present application by reference. Acceptable fluorometers include the Trasar® 3000 fluorometer from Nalco, an Ecolab Company, the Trasar® 8000 fluorometer from Nalco, an Ecolab Company and the modular fluorometer available from Nalco, an Ecolab Company, as well as the Hitachi F-4500 fluorometer. As an additional illustrative example, an all solid-state fluorometer can be used, such as any aspect of the fluorometer disclosed in U.S. Pat. No. 6,255,118, the contents of which are expressly incorporated into the present application by reference. The fluorometer can be a diode laser-based or light-emitting diode-based fluorometer that can be used to monitor fluorescent tracers bound to the scale inhibitors disclosed herein. It is to be understood that it may be necessary to reconfigure the fluorometer to optimize the set-up of the fluorometer and it is known to people of ordinary skill in the art of fluorometers how to set up a fluorometer to detect the desired fluorescent signals.

The fluorometer instrument may be combined with a suitable fluorescent tracer molecule or fluorescent tag bound to the scale inhibitor disclosed herein and used to monitor and control treatment dosage. As a result, on-line scale inhibitor feed control, which enables precise control of the amount of scale inhibitor into the system, can be achieved. Since the method can be on-line and automated, real time, automatic adjustments can be made to the amount of scale inhibitor being added to the irrigation water.

EXAMPLES

The presently disclosed scale inhibitors were tested in accordance with various experimental protocols and their beneficial technical effects were demonstrated.

In a first study, the following protocol was used:

Soil was sieved using #12 sieve. A mortar and pestle were utilized to aid in the sieving process. The soil was dried at 100° F. overnight to ensure consistent soil moisture content. Two grams (~2 mls) of a specified solution (established fertilizer/polymer concentrations) was added to a 50 ml plastic, conical, centrifuge tube. Eight grams of soil was also added to the centrifuge tube. The sample was hand shaken or agitated to ensure good mixing. Each soil/solution mixture was prepared in triplicate. Fertilizer and/or scale inhibitor was exposed to the soil for some given time ("x") and conducted at some given temperature ("t"). Depending upon the experiment, time was in the range of 0-30 days and temperature was either 6° C. or 23° C. After said exposure time, 40 ml of DI water was added to the soil. The resulting suspension was mixed and shaken for approximately 12 hours on a bench-top shaker table. The sample was then centrifuged for 10 minutes @5000 rpm. The liquid portion of the sample was then filtered (0.45 um) to obtain a clear filtrate. The filtrate was then analyzed via ICP for total phosphorous and other metals. The results of this experiment are depicted below in Table 1.

TABLE 1

| | | Exposure Time = 14 days | | | | |
|---|---|---|---|---|---|---|
| Soil | Soil ph | Fertilizer: 0 AA/AMPS: 0 (mg/kg) | Fertilizer: 3.75 AA/AMPS: 0 (mg/kg) | Fertilizer: 3.75 AA/AMPS: 520 (mg/kg) | % Recovery of Fertilizer w/o AA/AMPS | % Recovery of Fertilizer with AA/AMPS |
| Kansas Clay Loam | 6.51 | 5.2 mg/ml | 6.7 mg/ml | 5.0 mg/ml | 40 | −5.3 |
| Arizona Loamy Sand* | 8.25 | 4.7 mg/ml | 5.8 mg/ml | 8.5 mg/ml | 27 | 101 |
| Arizona Loamy Sand | 8.25 | 4.7 mg/ml | 5.3 mg/ml | 7.8 mg/ml | 16 | 83 |
| Arizona Clay Loam | 8.06 | 5.2 mg/ml | 5.5 mg/ml | 6.4 mg/ml | 8 | 32 |
| Kansas Silt Clay | 7.88 | 3.7 mg/ml | 4.1 mg/ml | 4.2 mg/ml | 11 | 13 |
| Kansas Silt Loam | 8.01 | 2.7 mg/ml | 2.8 mg/ml | 3.0 mg/ml | 3 | 8 |

The third column shows that no fertilizer was added to the soil and no scale inhibitor was added to the soil. This column depicts the control trial to determine the amount of recoverable (labile) phosphorus in the soil in its natural state. The fourth column depicts results where fertilizer was added to the soil but no scale inhibitor was added. Since fertilizer has been added to the soil, the recovery of phosphorus would be expected to be greater than in column 3. The fifth column depicts the results when adding fertilizer and a scale inhibitor (AA/AMPS—about 50/50 monomer ratio, although a range of about 90/10 to about 10/90 is contemplated by this disclosure) to the soil. The sixth column shows the percent recovery of labile phosphorus when no scale inhibitor is added and the seventh column shows the recovery of labile phosphorus when one of the presently disclosed scale inhibitors is added to the soil. As can be seen, at least with respect to the Arizona soils, the presently disclosed scale inhibitors significantly increase the amount of labile phosphorus, which is the form of phosphorus that is useful to the crops.

As can be further noted, pH has an effect on the present treatment and in general, the presently disclosure may generally work better with basic soils. Even further, soil type, clay content, Olsen P, pH, as well as treatment chemistry, all can influence the availability of labile phosphate.

A similar experiment was run using the sulfomethylated AA/ACAM (monomer ratio of about 40/20/40) scale inhibitor. Results are shown below in Table 2.

TABLE 2

| | Exposure Time = 14 days | | | | |
|---|---|---|---|---|---|
| Soil | Fertilizer: 0 Scale inhibitor: 0 (mg/kg) | Fertilizer: 3.75 Scale inhibitor: 0 (mg/kg) | Fertilizer: 3.75 Scale inhibitor: 520 (mg/kg) | % Recovery of fertilizer w/o scale inhibitor | % Recovery of fertilizer w/scale inhibitor |
| Arizona Loamy Sand | 5.1 | 5.7 | 8.2 | 16% | 83% |

In another series of experiments, the AA/AMPS scale inhibitor was tested in a greenhouse study in connection with lettuce. Set up details can be seen in Table 3. Lettuce was seeded into trays and irrigated with Colorado River water. The seedlings were periodically fertilized with nitrogen applied as potassium nitrate, calcium nitrate, and urea. A small amount of potassium phosphate was also applied to sustain seedlings until transplanting.

Approximately 1.6 kg of soil was weighed into 15 cm diameter pots. The soil used was a Superstition sand collected locally and it tested a pre-plant sodium bicarbonate extractable P of 9.6 mg/kg. All pots were pre-watered with Colorado River water. A 0.7 cm diameter hole was inserted 5 cm deep and 3.5 cm to the side of where lettuce seedling would be transplanted. Combinations of scale inhibitor (AA/AMPS), followed by the P fertilizer 10-34-0, were injected into this hole using an automatic pipette. This hole was covered before transplanting. Lettuce transplants were planted into the center of the pots. The experiment was a randomized complete block with four replications. Nitrogen was applied as needed throughout the growth period in the irrigation water. Initially, the experiment was set up for three separate harvest dates. The lettuce was harvested and fresh and dry weights were recorded. All tissue and soil samples were dried and processed for analysis. Phosphorus concentrations in the above ground plant were determined colorimetrically after digestion with peroxide and sulfuric acid and total P uptake was calculated. Soils were sampled and residual P was determined colorimetrically after sodium bicarbonate extraction.

Results are shown in FIG. 1. In summary, dry weights of plants in soil treated with the presently disclosed scale inhibitor were 3× greater plants in untreated soil at optimal scale inhibitor dosage and fertilizer dosage, about 0.25 g/pot and about 0.08 g/pot, respectively.

TABLE 3

Treatments Applied In Lettuce Greenhouse Experiment

| Treatment | Polymer (mL/pot) | 10-34-00 (mL/pot) | P (g/pot) |
|---|---|---|---|
| 1 | 0 | 0 | 0 |
| 2 | 0 | 0 | 0 |
| 3 | 1 | 0 | 0 |
| 4 | 0.5 | 0.4 | 0.08 |
| 5 | 1 | 0.4 | 0.08 |
| 6 | 0.5 | 0.4 | 0.08 |
| 7 | 1 | 0.8 | 0.16 |
| 8 | 0.5 | 0.8 | 0.16 |
| 9 | 1 | 0.8 | 0.16 |

Sweet corn experiments were similarly conducted. Sweet corn was seeded and grown in trays as described above for lettuce. These trays received nitrogen but no phosphorus fertilizer. Pots were prepared as described above and combinations of the AA/AMPS polymer and 10-34-0 were applied as shown in Table 4. Sweet corn seedlings were transplanted into the pots. The experimental design was randomized complete block with four replications. Nitrogen was applied as needed throughout the growth period in the irrigation water. The experiment was harvested and fresh and dry weights were recorded. All tissue and soil samples were dried and processed for analysis as described above.

TABLE 4

Treatments Applied In Sweet Corn Greenhouse Study

| Treatment | Polymer (mL/pot) | 10-34-00 (mL/pot) | P (g/pot) |
|---|---|---|---|
| 1 | 0 | 0 | 0 |
| 2 | 0.5 | 0 | 0 |
| 3 | 1.0 | 0 | 0 |
| 4 | 2.0 | 0 | 0 |
| 5 | 0 | 0.30 | 0.04 |
| 6 | 0.50 | 0.30 | 0.04 |
| 7 | 1.0 | 0.30 | 0.04 |
| 8 | 2.0 | 0.30 | 0.04 |
| 9 | 0 | 0.61 | 0.08 |
| 10 | 0.50 | 0.61 | 0.08 |
| 11 | 1.0 | 0.61 | 0.08 |
| 12 | 2.0 | 0.61 | 0.08 |
| 13 | 0 | 1.22 | 0.17 |
| 14 | 0.5 | 1.22 | 0.17 |
| 15 | 1.0 | 1.22 | 0.17 |
| 16 | 2.0 | 1.22 | 0.17 |

Figure 2:
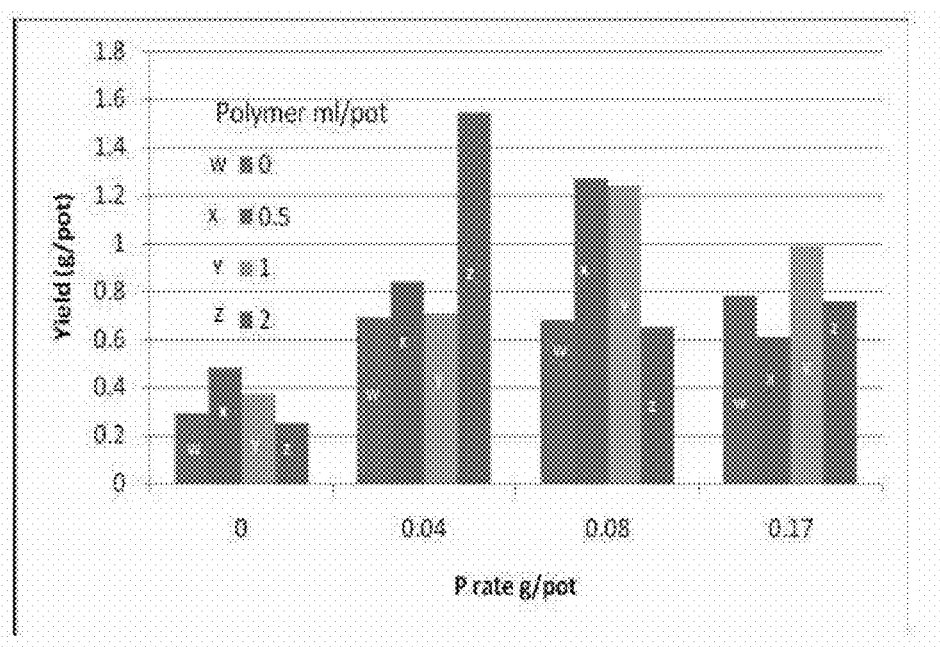
FIG. 2 shows dry weights of plants from a different experiment where the soil was treated with different amounts of a presently disclosed scale inhibitor versus dry weights of plants in untreated soil.

The results of this study are depicted in FIG. 2, which clearly indicates that the dry weights of plants in treated soil was much greater than plants in untreated soil at optimal treatment and fertilizer dosages. There was a 3× increase in dry weight using the AA/AMPS scale inhibitor treatment at 1.0 g/pot and fertilizer at 0.04 g/pot. There was a 2.5× increase in weight using the AA/AMPS scale inhibitor treatment at 0.25 g/pot and fertilizer at 0.08 g/pot.

A second series of sweet corn experiments was conducted as above except a different fertilizer was used. Sweet corn was seeded and grown in trays as described above for lettuce. These trays received nitrogen but no phosphorus fertilizer. Pots were prepared as described above and combinations of the AA/AMPS polymer and 00-52-00 were applied as shown in Table 5.

TABLE 5

| Treatment | Polymer rate (ml/pot) | 00-52-00 rate (mL/pot) | P rate (g/pot) |
|---|---|---|---|
| 1 | 0 | 0 | 0 |
| 2 | 0.5 | 0 | 0 |
| 3 | 1.0 | 0 | 0 |
| 4 | 2.0 | 0 | 0 |
| 5 | 0 | 0.2 | 0.04 |
| 6 | 0.5 | 0.2 | 0.04 |
| 7 | 1.0 | 0.2 | 0.04 |
| 8 | 2.0 | 0.2 | 0.04 |
| 9 | 0 | 0.4 | 0.08 |
| 10 | 0.5 | 0.4 | 0.08 |
| 11 | 1.0 | 0.4 | 0.08 |
| 12 | 2.0 | 0.4 | 0.08 |
| 13 | 0 | 0.8 | 0.17 |
| 14 | 0.5 | 0.8 | 0.17 |
| 15 | 1.0 | 0.8 | 0.17 |
| 16 | 2.0 | 0.8 | 0.17 |

Figure 3:
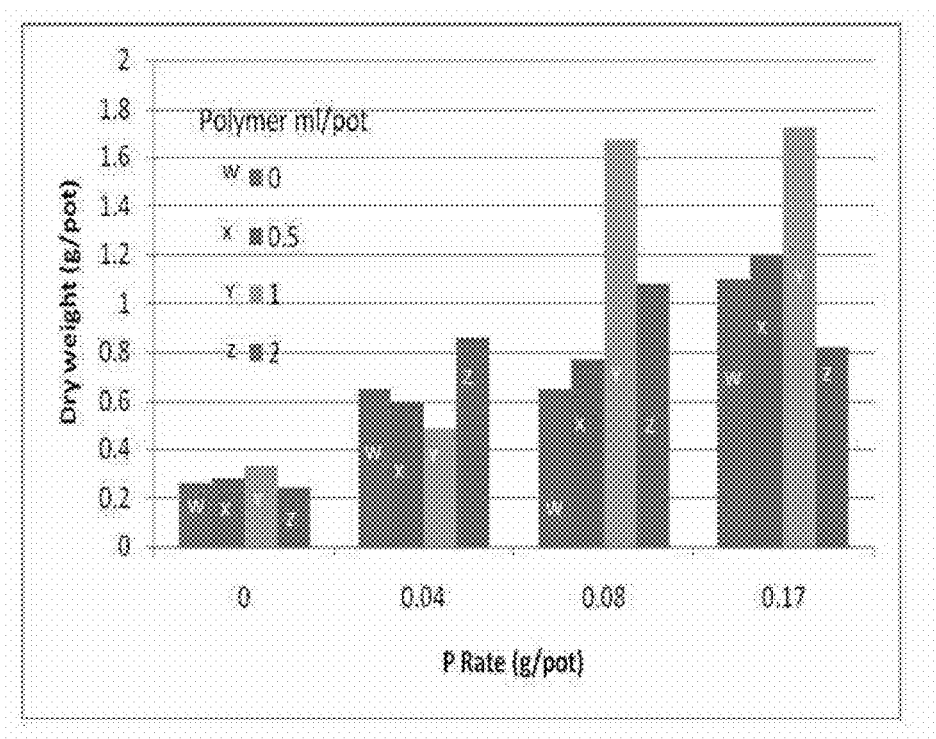
FIG. 3 shows dry weights of plants from yet another experiment where the soil was treated with different amounts of a presently disclosed scale inhibitor versus dry weights of plants in untreated soil.

The results of this study are depicted in FIG. 3. As can be seen, the dry weights of the plants in scale inhibitor treated soil were 3× greater than plants in untreated soil at optimal AA/AMPS dosage and fertilizer dosage.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of monitoring, determining, and controlling the concentration of scale inhibitors in an agricultural irrigation system comprising:

providing an irrigation pipeline having a first end, a second end, and a side stream pipe near the second end;

providing a water pump in communication with a water source, said water source and water pump being in fluid communication with the first end of the irrigation pipeline;

providing a scale inhibitor pump in communication with a scale inhibitor storage device, said scale inhibitor pump being in fluid communication with an injection site near the first end of the irrigation pipeline, wherein said scale inhibitor storage device comprises one or more scale inhibitor compositions, further wherein a fluorescent tag is copolymerized onto a backbone of the one or more scale inhibitor compositions;

providing a fluorometer that is operably connected to and in communication with the side stream pipe of the irrigation pipeline, wherein the fluorometer comprises a controller;

preprogramming an optimal fluorescent signal value into the controller;

pumping water into the first end of the irrigation pipeline;

pumping a known amount of the one or more scale inhibitor compositions into the injection site of the irrigation pipeline such that the one or more scale inhibitor compositions combine with the water to form a mixture;

allowing the mixture to flow through the pipeline such that a majority of the mixture exits the second end of the pipeline and a portion of the mixture is routed through the side stream pipe and the fluorometer; and measuring the fluorescent signal of the portion of the mixture.

2. The method of claim 1, further comprising the steps of having the controller automatically compare the measured fluorescent signal to the preprogrammed optimal fluorescent signal value and if the measured fluorescent signal is above the optimal fluorescent signal value, sending a communication from the controller to the scale inhibitor pump causing the pump to automatically reduce the amount of the one or more scale inhibitor compositions being pumped into the injection site of the pipeline.

3. The method of claim 1, further comprising the steps of having the controller automatically compare the measured fluorescent signal to the preprogrammed optimal fluorescent signal value and if the measured fluorescent signal is below the optimal fluorescent signal value, sending a communication from the controller to the scale inhibitor pump causing the pump to automatically increase the amount of the one or more scale inhibitor compositions being pumped into the injection site of the pipeline.

4. The method of claim 1, wherein the fluorescent tag comprises a compound selected from the group consisting of hydroxyl allyloxy propyl naphthalimide quaternary salt, pyrene tetrasulfonic acid, and naphthalenedisulfonic acid.

5. The method of claim 1, wherein the scale inhibitor composition comprises about 2% by weight of the fluorescent tag.

6. The method of claim 1, wherein the one or more scale inhibitor compositions are selected from the group consisting of phosphonates, sulfonates, polymers of ethylenically unsaturated carboxylic acids, polyaminopolyethermethylene phosphonate, polysuccinic oligomers, acrylic acid/2-acrylamido-2-methylpropane sulfonic acid, blends of acrylic acid/2-acrylamido-2-methylpropane sulfonic acid with polyaminopolyethermethylene phosphonate, sulfomethylated acrylic acid/acrylamide, blends of sulfomethylated acrylic acid/acrylamide with polyaminopolyethermethylene phosphonate, polymaleic acid, acrylic acid/acrylamide copolymers, polyacrylic acid, trimethylglycine hydrochloride, blends of polyaminopolyethermethylene phosphonate with trimethylglycine hydrochloride, and any combination or salt thereof.

7. The method of claim 1, wherein the one or more scale inhibitor compositions are selected from the group consisting of a sulfomethylated acrylic acid/acrylamide copolymer and an acrylic acid/2-acrylamido-2-methylpropane sulfonic acid copolymer.

* * * * *